United States Patent [19]

Kelley

[11] Patent Number: 4,593,772
[45] Date of Patent: Jun. 10, 1986

[54] ROTARY CUTTER FOR CABLE FOLLOWING APPARATUS

[75] Inventor: Douglas P. Kelley, Redmond, Calif.

[73] Assignee: Electric Power Research Institute, Inc., Palo Alto, Calif.

[21] Appl. No.: 572,092

[22] Filed: Jan. 18, 1984

Related U.S. Application Data

[63] Continuation-in-part of Ser. No. 414,483, Sep. 2, 1982, abandoned.

[51] Int. Cl.⁴ .................. E21B 19/08; E21B 23/00
[52] U.S. Cl. ........................... 175/53; 175/69;
175/67; 175/394; 405/184
[58] Field of Search .............. 175/53, 230, 65, 67,
175/69, 71, 394; 254/134.6, 105, 134.5, 134.3
FT; 104/165, 202; 405/184

[56] References Cited

U.S. PATENT DOCUMENTS

| | | |
|---|---|---|
| 1,370,677 | 3/1921 | Wooldridge ................. 175/394 |
| 1,868,400 | 7/1932 | Stover ........................... 175/69 |
| 1,994,884 | 3/1935 | Chew ............................ 175/67 |
| 2,278,137 | 3/1942 | Overholt ....................... 175/394 |
| 3,198,267 | 8/1965 | Madson ......................... 175/69 |
| 3,416,614 | 12/1968 | Goodwin et al. ............... 175/67 |
| 4,117,895 | 10/1978 | Ward et al. .................. 405/184 X |
| 4,119,160 | 10/1978 | Summers et al. ............... 175/67 |
| 4,385,667 | 5/1983 | Reichman et al. .......... 254/134.6 X |
| 4,403,667 | 9/1983 | Reichman et al. ............. 175/230 |

Primary Examiner—Stephen J. Novosad
Assistant Examiner—Thuy M. Bui
Attorney, Agent, or Firm—Flehr, Hohbach, Test, Albritton & Herbert

[57] ABSTRACT

A cable following apparatus has a rotating annulus at the front portion of its main body where a cylindrical axial opening of the body passing over a cable first comes in contact with concentric neutral wires. The annulus, by rotating in the direction of the neutral wrapping wires, has the effect of wrapping down any wires that are broken. Further, a helical groove in the annulus extends forward beyond a static cutter plate providing a front surface of the main body. The end of the groove rotates slightly behind the static cutting surface of the plate. Wires that are broken and pulled away from the cable are picked up by the groove and carried to a position where they are cut off by the force of the side of the helical groove pressing them against the static cutter surface of the plate.

18 Claims, 3 Drawing Figures

FIG.—1

ROTARY CUTTER FOR CABLE FOLLOWING APPARATUS

This application is a continuation-in-part of U.S. application Ser. No. 414,483 filed Sept. 2, 1982, in the name of Douglas P. Kelley, now abandoned.

The present invention relates generally to servicing underground cable and more particularly to a specific apparatus for removing existing underground cable and replacing it with new cable.

At the present time, there are thousands of miles of electrical distribution cables and other types of service cables buried under the ground. At some point in the future, a failure in each of these cables will occur and the failed cable will have to be replaced. Most such service cables were initially buried in and along trenches along undeveloped land; therefore, access to the cables was relatively easy by digging them up. However, a common problem is now that since streets, sidewalks, landscaping and other improvements have been made the buried cable has become relatively inaccessible. Nevertheless, the most common technique for replacing existing cable is to follow the original trench and retrieve and replace the cable at the expense of the above ground improvements. This of course is time consuming, costly and in many cases inconvenient. An alternative approach to this has been to utilize a horizontal boring technique which requires digging a pit and using an impacting device to bore a hole. While this technique eliminates the destruction and restoration of ground developments, it has the inherent problems of not being clearly directionally controllable, and therefore the bore may not exit at the desired point or follow the cable accurately.

In view of the forgoing, cable following apparatus has been developed which provides a new technique for replacing an existing underground cable. The apparatus as disclosed in for example U.S. Pat. No. 4,385,667 (Reichman et al) incorporated herein by reference, which includes a main body or cable follower which is slidable or movable along the cable to be replaced. The apparatus includes fluid jets for cutting soil around the cable. Once the soil surrounding the cable has been loosened using such apparatus, the cable can be easily pulled out of the ground. At the same time, the replacement cable can be attached to the existing cable and pulled into its place.

Other specific cable following arrangements are disclosed in the Reichman et al application Ser. No. 289,211 filed Aug. 3, 1981 and especially FIGS. 6 to 9 which include a telescopically configured main body, a pair of cable griping mechanisms and a hydraulically actuated piston cylinder device. The housing is disposed around the cable to be replaced and the piston cylinder unit is used to cause the cable gripping mechanisms to grip and release the cable in a way which causes the telescopic body to slide along the cable in a forward direction.

The latest development in this field is described in the application entitled: "CABLE GRIPPING APPARATUS HAVING FORWARD AND REWARD MOVEMENT CAPABILITIES" applied for by Douglas P. Kelley and assigned Ser. No. 414,483 Sept. 2, 1982. This application which is incorporated herein by reference discloses cable following apparatus having a main body, means connected with the main body and utilizing first and second cable grippers for alternately gripping an associated cable to move the main body in a forward direction along the cable; and means for releasing both of the grippers so that its main body can be moved rearwardly along the cable by means of a tow rope. The present application is a continuation in part of the subject Kelley application with which the present modification is especially useful. However, the modification may prove to be useful in combination with the cable followers disclosed in all of the above referenced applications.

A problem faced in common by all previous generations of cable follower tools was the incorporation of a static annular opening where the cable entered the tool. This design works well on jacketed cable, but encounters problems in the course of travel over a concentric neutral cable. The annulus, when sliding over concentric neutral cable which as is well known is surrounded by or wrapped with generally helical wires, pushes any corroded or broken neutral wires ahead of the annulus. The result is that these neutral wires tend to bunch up in front of the moving annulus. When a number of wires accumulate, the cable follower comes to a halt. It is therefore an object of the present invention to provide an improved cable following apparatus which is capable of following the entire length of concentric neutral cable without being hung up by broken or corroded neutral wires.

A further problem with the broken neutral wire problem which follows from the problems discussed above, is that when a sufficient number of broken or corroded wires are accumulated to stop movement of the cable follower, this stoppage typically occurs under ground. While the distance along the cable at which the bunching occurs can be roughly calculated, the only known ways to overcome a bunching problem once it occurs are to either take the cable follower to the opposite end of the cable and attempt to loosen the cable all the way to the bunched portion starting from the opposite end, resulting in a significant loss of time; or, to dig down from the earth to the approximate point where the cable follower was stopped, and manually remove the bunched wires. Obviously, this also results in a loss of many of the advantages of the cable follower invention, making it more difficult to justify the operation of the tool.

It is therefore an objective of the present invention to provide a modified cable follower which is capable of eliminating the problem of bunched corroded and broken neutral wires.

It is another object of the present invention to provide means for wrapping down broken or corroded wires more tightly against the cable so that the cable follower is not retarded in its progress, and so that the cable can be smoothly pulled out of the channel when the cable follower has finished its work.

These and other objectives are achieved by providing within the main body of the cable following apparatus, a rotating annulus at the front portion of the body where the opening of the body passing over the cable first comes in contact with the concentric neutral wires. The annulus, by rotating in the direction of the neutral wrapping wires, has the effect of wrapping down any wires that are broken. As a result, rather than bunching in front of the annulus as occurs with a static annulus, the upstanding ends of the wires are wrapped back down against the cable. In a further improvement, a helical groove is cut in the front surface of the rotating annulus. The opening to this rotating helical groove extends beyond a static cutter plate which comprises a major portion of the front surface of the main body. The groove angles back along one side of the annulus at an angle which is close to but less than perpendicular to the direction of travel of the main body. As a result, the terminal end portion of the helical groove is rotating in a plane slightly behind the static cutting surface. Wires that are broken and pulled away from the cable are picked up and carried through the groove to a position where they are held against the surface of the static cutter and cut off by the force of the side of the helical groove pressing the wire against the static cutter surface face. Thus wires that are broken and pulled away from the cable can be cut off to a length that can be wrapped down against the cable by the continued rotation of the rotating annulus.

In a further improvement, the helix angle is chosen (preferably about 8°) to be at an angle where rocks would tend to roll out of the cutting helix with rotation of the annulus. Further, compressed air is released through the center of the annulus to reduce the ingestion of gravel. Preferably, the air is carried through air flush lines which pass through a static portion of the frame of the main body to a location even with the static cutting surface and rotating cutting groove. The air is released into the area of the center of the annulus through passages in the rotating helical cutter.

The improved cable gripping apparatus disclosed herein will be described in more detail in conjunction with the drawings wherein.

Figure 1:
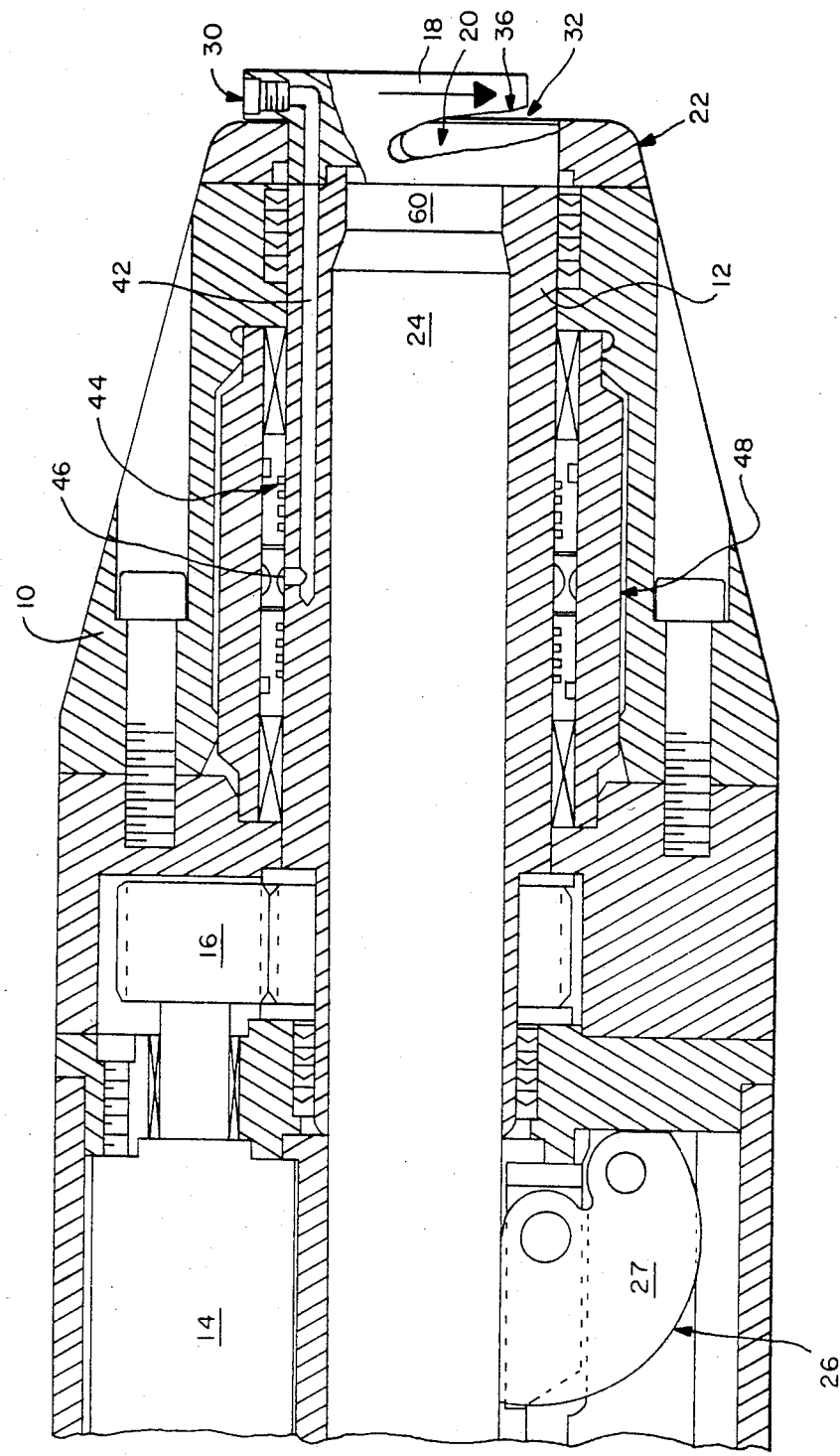
FIG. 1 is a partially broken away longitudinal sectional view of the cable following apparatus.

Referring now to the drawings, FIG. 1 illustrates the portions of a cable following apparatus which are of major significance in understanding this invention. The apparatus includes a support tube or main body portion 10 defining a cylinder 24 and carrying at its front a rotating annulus 12 which defines the front portion of the cylinder. The rotating annulus is driven by a hydraulic motor 14 through a gear drive 16 such as is well known in this technology.

The front portion of the annulus comprises a helical groove 20 which cooperates with a static cutting surface 22 to cut off wire that are broken off and pulled away from the cable, so that the cable can pass relatively easily into the open end of the cylinder 11 defined by the rotating annulus 12. The other key portions of the cable follower comprise a drive mechanism a portion of which is generally indicated at 26 which has grippers e.g. 27 for pulling the cable follower forward along the length of the cable all as disclosed in the parent Kelley application; means in the form of nozzles in the front end portion 18 of the annulus 12 for defining a high pressure fluid jet for loosening the soil around the cable as disclosed in the incorporated Reichman U.S. Pat. No. 4,385,667 and air jets as shown in FIG. 3 of the present application for minimizing the number of pebbles or the like which can pass into the annulus defined in cylinder 24. As can be seen from FIG. 1 and FIG. 2, by rotating the annulus in the direction of the neutral wrapping wires, the wires tend to be wrapped down against the cable allowing the cable to pass easily into cylinder 24.

For cases where the wires are broken, the ends are picked up by the opening 32 into the helical groove 20. This opening 32 extends beyond the front of the static cutting plate 22, which constitutes the front surface of the cable follower. Thus as the broken wire ends come into contact with the cable follower the rotating groove in the annulus picks up the ends which are then forced toward the static cutting surface by the reamed angle of the groove in the annulus. As can be seen by inspection of FIG. 2, since the static cutting surface 22 completely surrounds the annular opening which comprises the rotating portion of the annulus, with a gap 34 of no more than 1/5000 of an inch, the wires are forced up against the static cutting surface and cut off by the pressure between the forward edge 36 of the groove and the front edge of the static cutting surface 22. Thus any wires which would otherwise tend to bunch up ahead of the cable follower are cut off and fall to the side of the cable follower, whereby its passage along the cable is relatively unimpeded.

A further detail of the device which is apparent from FIG. 1 and is useful to note as a part of the mechanical construction of the cable follower, is that the mud which comprises a mixture of water and betonite is supplied to the port 30 through a channel 42 which is carried in the rotating annulus. In order to connect this channel 42 with the mud supply line, a labyrinth type seal such as is known in this technology is provided. The mud supply (not shown) passes into this seal from a mud supply line and out into the channel through an opening 46 which is constantly in communication with the channel 42. The labyrinth seal which is grease lubricated is necessary to provide for free rotation of the annulus within the swivel housing 48. The mud is forcefully ejected both ahead of and to the side of the cable follower by ports 30 which rotate with the annulus thus only 2 ports need be provided as opposed to the several of the prior art.

Figure 2:
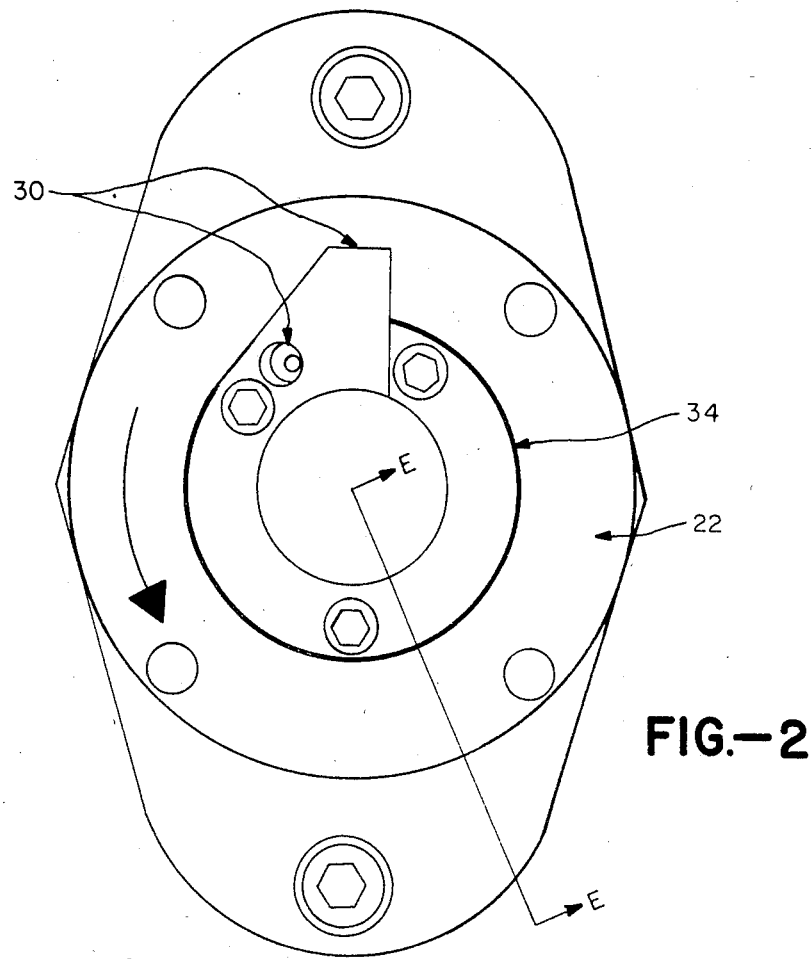
FIG. 2 is a front view of the cable following apparatus of FIG. 1.
Figure 3:
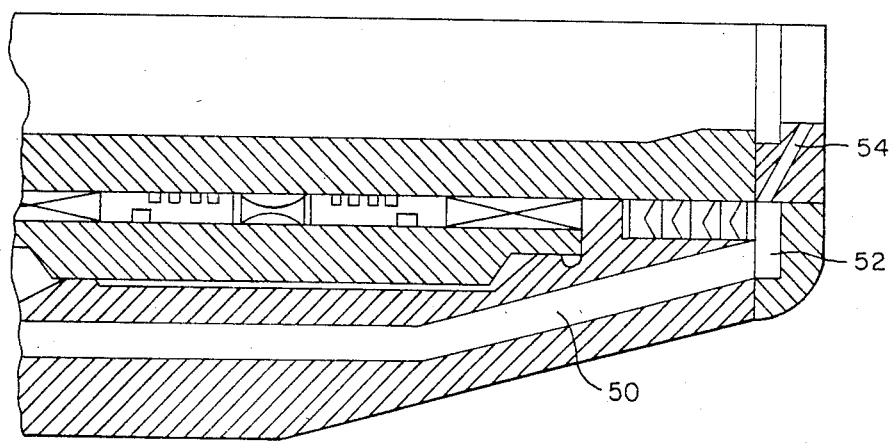
FIG. 3 is a sectional view taken along the section line FF of FIG. 3 showing the air supply and flush line which supplies air pressure to the front portion of the annulus and the grooves in the rotating helical cutter which comprises the front portion of the annulus.

A further important feature of the present improvement appears in FIG. 3 which is a section taken along line EE of FIG. 2. This section in addition to showing annulus 12 which terminates in the rotating cutter 18, shows an air supply line 50 which passes through a channel 52 to the rear of the static cutting surface 22, and into a groove 54 cut in the face of the end portion of the static cutting. By provision of this groove, a significant flow of air can be supplied to the open end of the cylinder 24 defined by the rotating annulus. This high pressure air results in a significant reduction in the ingestion of gravel into the end of the cable follower. The reduced rock and gravel input is also supported by the groove 20 being cut at an angle of about 8° away from a perpendicular to the direction of travel along the cable. By providing this selected helix angle, rocks which lie in the bottom of the cable trench tend to roll back out of the cutting helix even while the neutral wire by means of tension created by the wrapping action as the cutting portion of the annulus rotates around the wire and pulls the wire back against the cutting surface. Gravel ingestion is also reduced by reducing the open cross-section of the cylinder 24; the enlarged cross section of the annulus also provides more mechanical support for the cutter.

In summary, the rotation of a center entry annulus in the cable follower provides the functions of both wrapping the wires tightly around the cable being followed, and cutting those wires which cannot be wrapped being to sharply broken. The rotation of the annulus also reduces the number of mud jets which must be provided; the mud distribution which is used to ease the passage of the follower through the cable trench is achieved by a port 30 which is angled at approximately 90° up from the direction of travel, and a forward directed mud jet shown in FIG. 2. Entry of gravel into the cylinder 24 is also minimized by the sharp angle of the cutting helix groove, and the air jets supply provided to the center of the cylindrical entry. The tight wrapping action of the rotating annulus also allows for a more close fit of the annular opening over the neutral cable, further reducing the entry of foreign material into the cylinder as shown at the reduced section 60 which forms the end portion of the cylinder 24.

The invention of this improved cable follower has been described with reference to a specific embodiment. The description is illustrative of the invention, and is not to be construed as limiting the invention. Various modifications and applications may occur to those skilled in the art without departing from the true spirit and scope of the invention as defined by the following claims.

What is claimed:

1. An apparatus for moving along the length of an existing underground cable in a forward direction comprising a main body, means for moving said main body in a forward direction along said cable, a cylinder within said main body through which said cable passes, an annulus carried by said main body surrounding the front portion of said cylinder and rotating around said cylinder to clean obstructions away from said cable.

2. An apparatus as claimed in claim 1 wherein said means for moving said body comprise cable gripping means extending into said cylinder, said rotating annulus extending from a front face of said main body to a point near to said cable gripping means.

3. An apparatus as claimed in claim 2 wherein said main body comprises means for conveying air to the front face of said body, and channel means in the front portion of said rotating annulus for releasing air around the cable entering said cylinder.

4. An apparatus as claimed in claim 3 further comprising means for releasing a high pressure stream of fluid in front of said main body comprising at least one nozzle rotating with said annulus and connected with a source of supply of said high pressure fluid.

5. An apparatus as claimed in claim 4 wherein said nozzle is open to the front of said rotating annulus to direct said fluid substantially forward of said apparatus along said cable.

6. An apparatus as claimed in claim 5 including a second nozzle opening through the portion of said annulus extending beyond said main body to direct said fluid substantially to the side of the direction of travel of said main body.

7. An apparatus as claimed in claim 1 for movement along wire wrapped cable, wherein said main body includes means for rotating said annulus in the direction of said wrap.

8. An apparatus as claimed in claim 1 wherein said main body of said apparatus has a front face, the rotating annulus extending beyond said front face and including a helical groove extending partially up the side of the annulus.

9. An apparatus as claimed in claim 8 wherein the front face of said main body includes a static cutting means surrounding said annulus, wires picked up by said groove being carried back against said static cutting means to cut off ends of said wires.

10. An apparatus as claimed in claim 8 further comprising means for releasing air from around the opening end of said cylinder receiving said cable to reduce ingestion of gravel around said cable.

11. An apparatus as claimed in claim 8 wherein the opening of said groove extends beyond the front face of said main body, said groove being angled in the direction of travel of the cable, at least a portion of said groove being located behind the front face of said body, whereby wires picked up by said rotating groove are carried back against the front face of said main body.

12. An apparatus as claimed in claim 11 wherein said helical groove has an angle of about 8° from the vertical, whereby rocks tend to roll out of said helical groove.

13. An apparatus for cutting soil around and along an existing cable having wire wrapped around in a given direction of rotation comprising a main body having a cylindrical tube axially slidable over the cable; means extending into said cylinder for advancing said main body along said cable; a rotating annular section defining a portion of said cylinder extending from a point forward of said advance means to and beyond a front face of said main body; means for rotating said annulus in the given direction of rotation the portion of said annulus extending to and beyond said front face including means for cutting broken wires, the rotation of said annulus wrapping said wires against said cable.

14. An apparatus as claimed in claim 13 wherein said cutting means comprise a helical groove extending up the side of said annulus, the opening of said groove extending beyond the front face of said main body, the terminal end of said groove rotating at least partially behind said front face, whereby wires picked up in said groove are drawn back against the front face of said body.

15. An apparatus as claimed in claim 14 wherein the front face of said main body includes a static cutting means surrounding said annulus, wires picked up by said groove being carried back against said static cutting means to cut off ends of said wires.

16. An apparatus as claimed in claim 14 further comprising means for releasing air from around the opening end of said cylinder receiving said cable to reduce ingestion of gravel around said cable.

17. An apparatus as claimed in claim 14 wherein said main body comprises means for conveying air to the front face of said body, and channel means in the front portion of said rotating annulus for releasing air around the cable entering said cylinder.

18. Apparatus as claimed in claim 17 wherein at least the front portion of said cylinder is of reduced cross section to reduce ingestion of gravel.

* * * * *